Dec. 20, 1960 R. ETTLINGER, JR 2,965,226
STACKING TRAY FOR GLASSES
Filed April 6, 1959
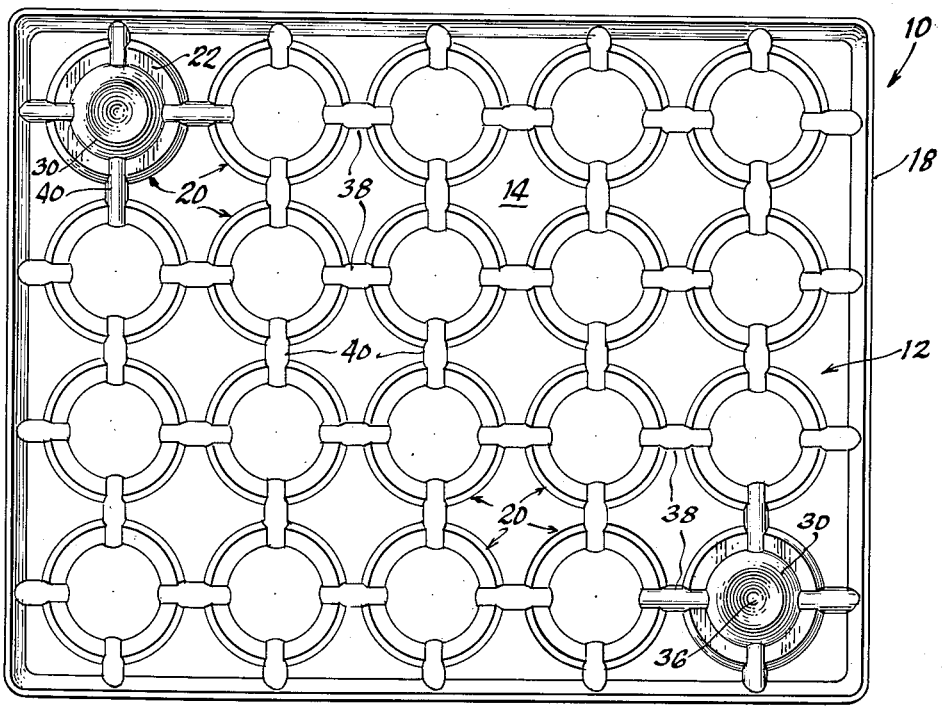
FIG. 1
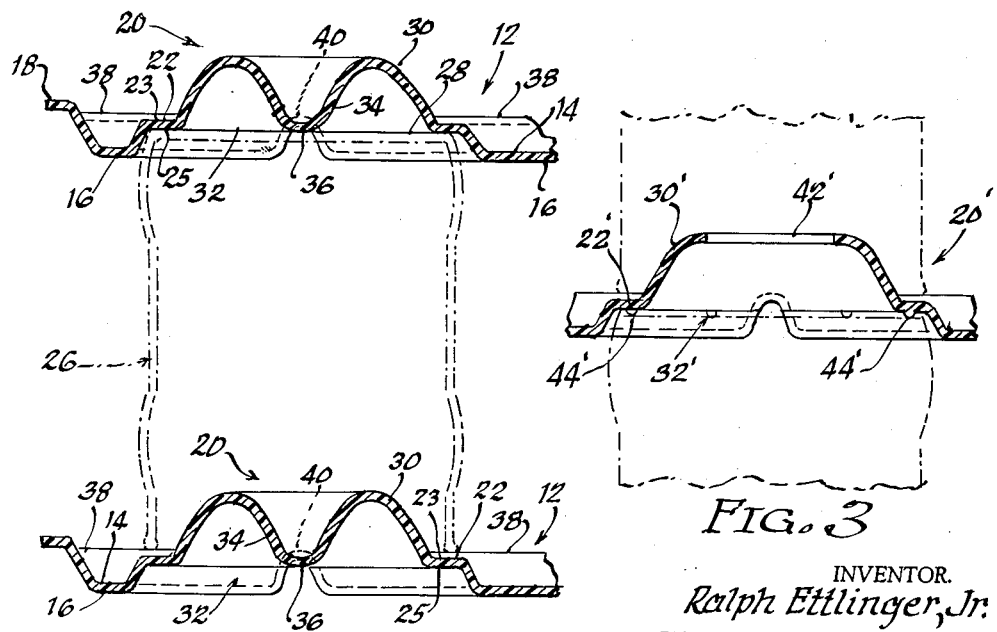
FIG. 2
FIG. 3
INVENTOR.
Ralph Ettlinger, Jr.
BY
Ooms, McDougall, Williams & Hersh
Attorneys 2,965,226
STACKING TRAY FOR GLASSES

Ralph Ettlinger, Jr., 1370 Lincoln Ave. S.,
Highland Park, Ill.

Filed Apr. 6, 1959, Ser. No. 804,347

6 Claims. (Cl. 206—72)

This invention relates to a tray and, more particularly, to a molded stacking tray for holding glasses thereon, and is an improvement on the tray described in copending application Serial No. 747,404, now Patent No. 2,941,663.

The handling of glasses presents an important economic problem to restaurant management. When glasses are permitted to rub against each other during washing or carrying, tiny scratches form on their outer surface. This gradually gives these glasses a clouded, unsanitary appearance and usually necessitates their replacement, at a substantial financial loss, even though the glasses may be structurally sound. A good deal of this abrasion occurs while the glasses are being carried in trays. If this rubbing contact could be reduced, the glasses would have a longer useful life. What is needed, therefore, and comprises an important object of this invention, is a tray having means thereon for holding the glasses in spaced, non-contacting relationship while they are being carried.

Another important object of this invention is a tray adapted to hold glasses in spaced, non-contacting relationship to each other and designed so the tray and the glasses thereon may be stacked one on top of the other in a stable pile, with a vertical separation of the glasses in each layer on the order of the thickness of the trays.

A still further object is to produce a tray of the type described in which use is made of projections of a special shape which function concurrently to accommodate a plurality of glasses in non-contacting relationship, and for strengthening the tray without using more material or a special reinforcement, and which operates to support the glasses in an inverted position upon ribbed surfaces to permit full access to the interior thereof for complete drainage, for air drying, to minimize steaming, and to permit access for washing by automatic washing machines.

These and other objects of this invention will become more apparent when read in the light of the accompanying drawings and specification, wherein—

Figure 1 is a plan view of the glass-holding tray;

Figure 2 is a side sectional view of a portion of a stack of trays holding a glass therebetween; and Figure 3 is a side sectional view of a modified glass-holding tray.

Referring now to Figure 1 of the drawings, a tray, indicated generally by the reference numeral 10, is in this particular embodiment formed from a moldable fibrous or plastic sheet material, although as will become apparent below, the tray could be stamped from other kinds of sheet material, and the claims should be construed accordingly. The tray comprises a generally planar support member 12, large in comparison to its thickness, and having opposed surfaces 14 and 16. The tray shown in the drawings is rectangular in shape, although its shape is not important. In addition, a peripheral rim 18 is formed on its periphery to strengthen it and to serve as a trough for the retention of water or other liquids.

As seen in Figure 1, the support member 12 is provided with a plurality of projecting members 20, integrally molded therewith and disposed in uniformly spaced relation over the tray. Each projecting member has a generally frusto-conical shape, and extends substantially perpendicular to the plane of surface 14. It is noted, however, that although projecting members having this particular shape are particularly well adapted for the use disclosed, projecting members having other shapes are contemplated, and the claims should be construed accordingly.

The small or upper base 22 of each projecting member 20 comprises a ledge with upper and lower surfaces 23 and 25. As seen in Figure 2, ribs 38 and 40 extending slightly above surface 23 support the rim 24 of a glass 26. The glass is quite conventional and, as shown, the diameter of the mouth as defined by rim 24 and the base 28 are substantially equal in size. The magnitude of the surface enclosed by ledges 22 is on the order of half the entire surface area of the tray, and this together with the uniform distribution of the projections, gives the tray a waffled form, which like corrugations provides the tray substantially increased strength and rigidity, without requiring the use of an increased amount of material or auxiliary reinforcing members.

As seen in Figure 2, a retaining projection 30 extends upwardly from each ledge 22 and is integrally formed therewith. This retaining projection, which is concentric with and radially and inwardly spaced from ledge 22, is adapted to extend in the mouth of a glass 26 to hold the glass in a restricted position.

This arrangement gives the projecting member 20 and the retaining projection 30 a combined function, i.e., that of holding the glasses in a spaced, non-contacting position with their rims 24 resting on ribs 38 and 40, and, since the projecting members 20 are part of the waffled form of the tray, they give the tray added strength and rigidity.

The formation of each projecting member 20 on surface 14 defines a correspondingly shaped glass-receiving recess 32, whose entrance is in surface 16 of the support member 12. Each recess is sized so it defines a seat for the base 28 of a glass 26, as shown in Figure 2. In this way, the glasses can be carried on tray 10 in an inverted position with their rims 24 resting on ribs 38 and 40 above surface 23 of ledge 22 and with retaining projection 30 extending inside the mouth of each glass 26, as shown in Figure 2, and the glasses will not be free to slide into engagement with each other. In addition, the trays with the glasses thereon may be stacked in a stable compact pile with the rim 24 of each glass resting on ribs and surrounding a retaining projection 30 on one tray, while the base of the glass extends in a seat defined by recess 32 in the next adjacent tray in the stack. With this arrangement, the glasses on adjacent trays in the stack will have a vertical separation substantially equally to the thickness of the tray.

The tray has been provided with another useful feature, with the addition of the base support member 34. As seen, the base support member is integrally formed on the upper portion of each retaining projection 30, and extends downwardly therefrom, terminating in a base-supporting surface 36. This base-supporting surface is concentric with and in substantially the same plane as the lower surface 25 of supporting ledge 22. With this arrangement, when the tray is carried with surface 16 facing upwardly, the base 28 of glasses filled with a liquid may be inserted in recess 32. When this is done, the peripheral portion of base 28 of the glass 26 will engage and be supported by the surface 25 of the ledge 22, while the central portion of the base of the glasses will engage and be supported by the base support surface 36. Consequently, the tray can be conveniently used to carry glasses filled with the liquids with no danger of them sliding on the tray and spilling. When reversed, this feature is also effective for stabilizing glasses positioned upside down on the tray.

As seen in Fig. 1, the ribs 38 and 40 on tray 10 are divided into two groups. The ribs in each group are in uniformly spaced, parallel relationship to each other, but perpendicular to the ribs in the other groups. In addition, in this particular embodiment, the ribs are parallel to the sides of the tray but this arrangement, although useful, is not critical, and other arrangements are possible, and the claims should be construed accordingly. These ribs extend upwardly from surface 14 of the support member 12 and terminate slightly above the top surface 23 of ledge 22. As further seen, four ribs intersect each retaining projection 30 and each projecting member 20 at angular intervals of 90°.

With this arrangement, the ribs have two functions. First of all, they engage the rim 24 of each glass 26 at four angularly spaced positions so that the major portion of the rim 24 is spaced above surface 23 of ledge 22 in a stable position. This permits the entrance of air to the interior of the glass so that moisture remaining in the glass after washing can evaporate. The ribbed support permits more complete drainage of the water and it provides access for the spray thrown by automatic washing machines and permits usage of the tray to support the glasses in commercial machines for washing or cleaning glasses.

In the modification shown in Figure 3, the base support member 34 has been eliminated to provide an opening 42' extending through the tray. These openings are generally concentric with and communicating with a recess 32. The entrance to the openings is defined by portions of retaining projections 30', which in this particular embodiment also define the openings 42', but it is noted that embodiments are contemplated where the opening is formed in the principal plane of surface 14, and only the entrance to the opening is formed by the portions of the retaining projection, and the claims should be construed accordingly. In addition, uniformly spaced projections 44' extend down from lower surface 25' of ledge 22, by an amount such that when the base of a glass extends in recess 32', as shown, projections 44' hold the base of the glass away from the lower surface 25' so that air can circulate around the base of the glass and through opening 42' to further increase the rate of moisture evaporation in the interior of the glass mounted on the opposite surface of the tray. This feature further enhances access for use in automatic washers and for drainage of water from the washed glasses.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. A tray for holding and stacking glasses comprising a support member having opposed surfaces and an area large in comparison to its thickness, said support member having projecting members in spaced relation to each other disposed over the support member, said projecting members extending outwardly from one surface and each terminating in a ledge to give the tray a waffled form for increasing its rigidity, means adapted to engage portions of the rim of the mouth of each glass for supporting and holding each glass above the surface of the ledge to permit air to circulate in the interior of the glass so that moisture remaining in the glass after washing can evaporate, at least one retaining projection extending out from each ledge and adapted to extend in the mouth of a glass for holding the glass in a restricted position, over each ledge, at least said projecting members defining a plurality of recesses whose entrance is in the opposite surface of said support member, said recesses defining a seat and sized to receive the base of a glass so that when trays of glasses are stacked up one on top of the other, the rim of each glass can rest above the ledge on one tray while its base extends in a recess in the next higher tray in the stack whereby glasses may be carried on the trays in a non-contacting position and the trays with the glasses thereon may be stacked one on top of the other in a stable pile.

2. The tray described in claim 1, wherein said ledge has upper and lower surfaces and said means includes spaced projections extending above each ledge by an amount sufficient to engage spaced portions of the rim of the glass to hold the rim away from a surface of the ledge by an amount sufficient to permit the entrance of air in the interior of the glass so that moisture remaining in the glass after washing can evaporate.

3. The tray described in claim 2, including openings extending through said support member, each opening generally concentric with and communicating with a recess, at least a portion of the periphery of the entrance to the openings defined by edges of said retaining projections, and spaced projections on the said lower surface of said ledge extending downwardly therefrom by an amount sufficient to engage spaced portions of the base of a glass and to thereby space the base of the glass away from the lower surface of said ledge so that access is available to the spray thrown by automatic washers and so that air can circulate around said base and pass through said opening to the interior of the glass mounted on the opposite surface of the tray to increase the rate of moisture evaporation therein.

4. A tray for holding and stacking glasses having a mouth and a base which are substantially the same size comprising a generally planar support member formed of rigid sheet material, said support member having uniformly spaced projecting members integrally formed thereon and disposed over the support member, said projecting members extending outwardly from one surface and terminating in a ledge to give the tray a waffled form for increasing its strength and rigidity, combined means integrally formed on the tray and adapted to engage spaced portions of the rim of the mouth of each glass for further increasing the rigidity and strength of the tray and for supporting each glass above the upper surface of each ledge in such a way as to permit the entrance of air to the interior of the glass so that moisture remaining in the glass after washing can evaporate, at least one upwardly extending retaining projection integrally formed on each ledge and extending out therefrom, each retaining projection adapted to extend in the mouth of a glass for holding the glass in a restricted position over each ledge, at least said projecting members defining a plurality of recesses whose entrance is in the opposite surface of said support member, said recesses defining a seat and sized to receive the base of glasses so that when trays of glasses are stacked one on top of the other the rim of the mouth of each glass is held above a ledge of one tray while its base extends in the recess in the next higher tray in the stack whereby glasses may be carried on the trays in a non-contacting position, and the trays with the glasses thereon may be stacked one on top of the other in a stable pile.

5. The tray described in claim 4, wherein said combined means includes two groups of spaced parallel ribs integrally formed in the tray, the ribs in each group perpendicular to each other and extending above said one surface of said plane support member to a point above each supporting ledge, four ribs intersecting each retaining projection at angular intervals of 90° whereby the rim of a glass supported by said supporting ledge is held a distance above the upper surface of said ledge which is sufficient to permit the entrance of air to the interior of the glass so that moisture remaining in the glass after washing can evaporate.

6. The tray described in claim 5, including openings extending through said support member, each opening generally concentric with and communicating with a recess, at least a portion of the periphery of the entrance to the openings defined by portions of said retaining projections, and spaced projections on the lower surface of said ledge, said spaced projections extending downwardly therefrom by an amount sufficient to engage spaced portions of the base of a glass and thereby space the glass away from the lower surface of said ledge so that air can circulate around said base and pass through said opening to the interior of the glass to increase the rate of moisture evaporation therein.

References Cited in the file of this patent

UNITED STATES PATENTS

| 2,215,252 | Randall et al. | Sept. 17, 1940 |
| 2,704,600 | Despres | Mar. 22, 1955 |